United States Patent [19]

Waldo

[11] 4,286,288
[45] Aug. 25, 1981

[54] APPARATUS AND METHOD FOR TAMPER RESISTANT CHANNEL ATTENUATION IN SUBSCRIPTION TELEVISION CONVERTER

[75] Inventor: James K. Waldo, El Paso, Tex.
[73] Assignee: Teleprompter Corporation, New York, N.Y.
[21] Appl. No.: 42,355
[22] Filed: May 25, 1979
[51] Int. Cl.³ .............................................. H04N 7/16
[52] U.S. Cl. .................................... 358/114; 358/115
[58] Field of Search .............................. 358/114, 115

[56] References Cited
U.S. PATENT DOCUMENTS

| | | | |
|---|---|---|---|
| 3,859,457 | 1/1975 | Kirk, Jr. ................................ | 358/114 |
| 3,989,887 | 11/1976 | Murphy ................................ | 358/114 |
| 4,085,422 | 4/1978 | Niwata et al. ....................... | 358/115 |
| 4,097,894 | 6/1978 | Tanner et al. ....................... | 358/114 |
| 4,099,203 | 7/1978 | Garodnick .......................... | 358/118 |

Primary Examiner—S. C. Buczinski
Attorney, Agent, or Firm—Pennie & Edmonds

[57] ABSTRACT

A tamper resistant subscription television converter is made by connecting a bandstop filter in the Radio Frequency circuit of the converter. The filter, for attenuating one or more preselected subscription television channels is connected in series at a location in the Radio Frequency circuit such that tampering with it would affect the converter's alignment. The filter is tuned to obtain maximum attenuation of the preselected channels and the converter is aligned for proper reception of the remaining channels. Any attempt to disable the attenuator results in unacceptable reception of all channels. A preferred bandstop filter is a constant K, T section L-C filter.

12 Claims, 6 Drawing Figures

APPARATUS AND METHOD FOR TAMPER RESISTANT CHANNEL ATTENUATION IN SUBSCRIPTION TELEVISION CONVERTER

TECHNICAL FIELD

The invention relates generally to television communication systems, and more particularly concerns an apparatus and method for tamper resistant attenuation of at least one of a plurality of subscription television channels in a subscription television converter.

BACKGROUND ART

In conventional television broadcasting, each transmitter station is assigned a channel having a predetermined frequency bandwidth. In the United States the radio frequency band for all television channels is 54 megahertz to 300 megahertz, with each channel being 6 megahertz wide. By convention the video information is amplitude modulated on a carrier 1.25 megahertz above the lower boundary of the channel and the audio information is frequency modulated on a carrier 5.75 megahertz above the lower boundary of the channel.

A subscription television system such as a modern cable television system usually provides all of the commercial channels available in a subscriber's area and in addition offers special programs on an unused channel or channels in the television band. It is customary to charge an additional fee for these special programs and not all subscribers are interested in paying for and receiving such special programs. For those customers it is necessary to block the reception of such programs without adversely affecting reception of the remaining channels.

Various methods have been suggested for blocking, or interfering with a subscription television signal to render it unintelligible to unauthorized subscribers. Several such systems are described in U.S. Pat. No. 4,099,203 to Garodnick et. al. for a "Television Signal Scrambling with Introduction of Replacement Program Signals". That patent discloses an apparatus for scrambling a subscription television channel by providing an interfering carrier intermediate the audio and video carriers of the channel. This interfering carrier may also carry a substitute audio and/or video message. These known methods require additional equipment to provide the interfering signals at the transmission site as well as apparatus in the subscription television converter for removing this signal at the receiving end for authorized subscribers.

DISCLOSURE OF INVENTION

The method and apparatus of the present invention provides tamper resistant attenuation of preselected channels in subscription television systems with significant improvement in function, simplicity and economy over those of the prior art. The method and apparatus of the invention accomplishes this result without the need of additional equipment at the transmission end of the system and without interfering with the remaining channels.

The method and apparatus of the present invention may be used with any of the standard subscription television converters currently in use and requires a minimum of assembly and adjustment. Significantly, any attempt to bypass, remove, or otherwise tamper with the attenuator of the invention causes interference with the reception of all of the channels in the converter, thereby rendering the method and apparatus highly tamper resistant.

Apparatus in accordance with the invention may comprise one or more bandstop, constant K, T section L-C filters designed and connected to attenuate one or more channels of a subscription television system, connected in the Radio Frequency circuit of a subscription television converter. Depending upon the type of converter, the filter may be connected in several alternative locations within the Radio Frequency circuit, however, it is preferably connected between the input radio frequency filter and the first mixer of the converter.

The method of the invention comprises the steps of inserting one or more bandstop constant K, T section filters so as to attenuate one or more subscription television channels in the Radio Frequency circuit of a subscription television converter; adjusting the filter(s) for maximum attenuation of the selected channel and aligning the Radio Frequency circuit of the converter for proper reception of the unattenuated channels.

BEST MODE FOR CARRYING OUT THE INVENTION

Figure 1:
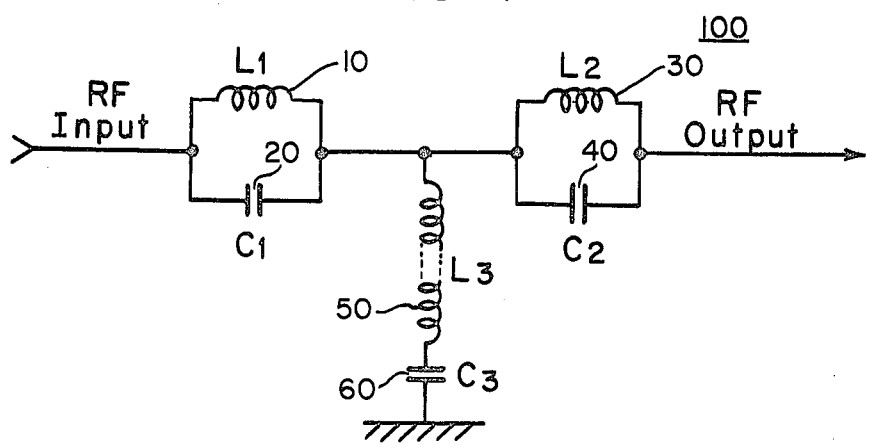
FIG. 1 is a schematic diagram of a bandstop, constant K, T section L-C filter employed as an attenuator in accordance with the invention.

Referring to FIG. 1 there is shown a schematic diagram of a bandstop, constant K, T section L-C filter 100 used as an attenuator in accordance with the invention. The component values may be calculated to a first approximation using known procedures such as those found at pages 179–181 of "Reference Data for Radio Engineers" published by International Telephone and Telegraph Corporation, 4th Edition 1956.

Figure 2:
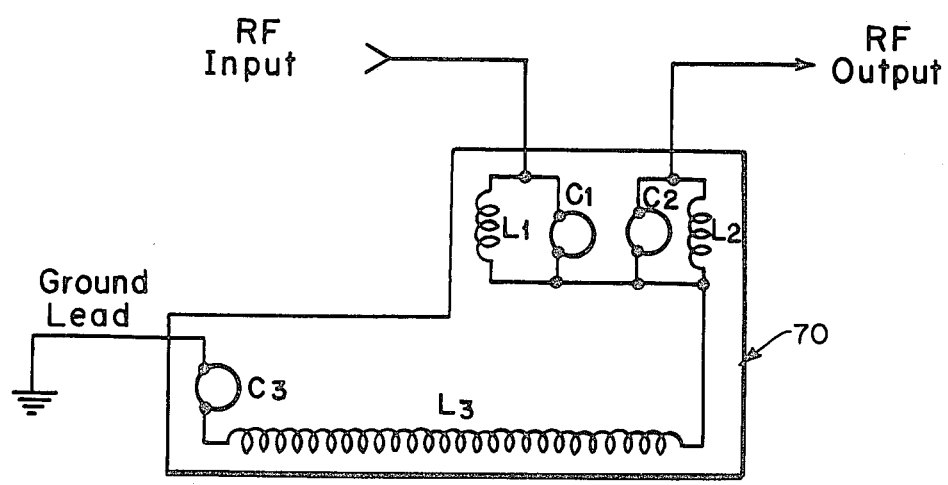
FIG. 2 shows the components of the attenuator mounted on a printed circuit board.

The components of the attenuator of FIG. 1 are preferably mounted on a printed circuit board 70 as shown in FIG. 2. The components are mounted as close as physically possible to the circuit board and all printed circuit leads are kept as short as possible so as to minimize the effects of stray capacitance.

Figure 3:
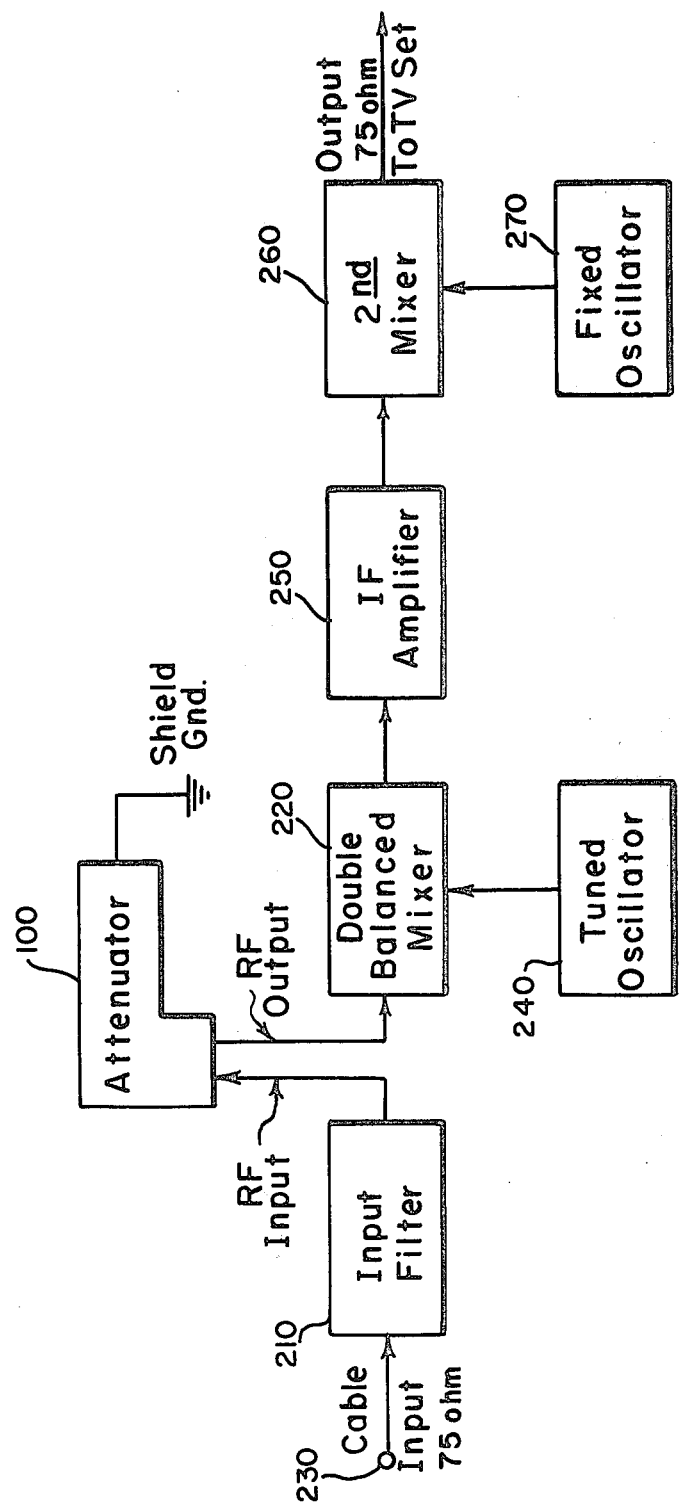
FIG. 3 is a schematic block diagram of a broad-band type subscription television converter showing the attenuator connected in the preferred position in the Radio Frequency circuit.

Referring now to FIG. 3 there is shown a block diagram of conventional broadband cable television converter with an attenuator 100 connected in accordance with a preferred embodiment of the invention between the input filter 210 and the double balanced mixer 220 in the Radio Frequency circuit of the converter. Alternatively, the attenuator may be connected between the cable input 230 and the input filter 210 or between the varactor tuned oscillator circuit 240 and the double balanced mixer circuit 220.

Figure 4:
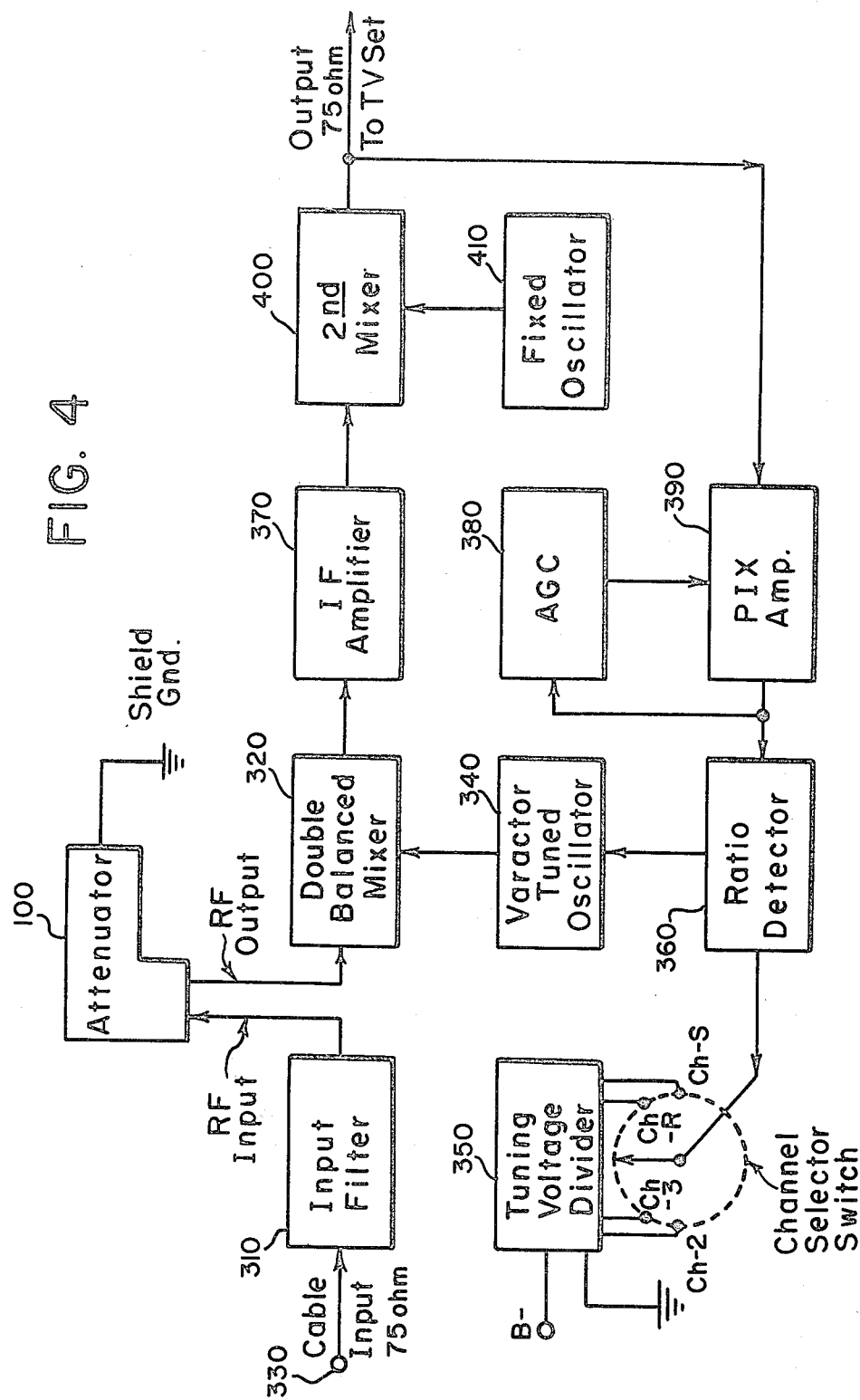
FIG. 4 is a schematic block diagram of a CATV varactor converter showing the preferred position of the attenuator in the Radio Frequency circuit.

Referring now to FIG. 4 there is shown a block diagram of a conventional cable television varactor converter. The preferred connection of the attenuator 100 in accordance with the invention is between the input filter 310 and the double balanced mixer 330 in the Radio Frequency circuit of the converter. Alternatively, the attenuator may be connected between the cable input 330 and the input filter 310 or between the varactor tuned oscillator circuit 340 and the double balanced mixer circuit 320.

Figure 5:
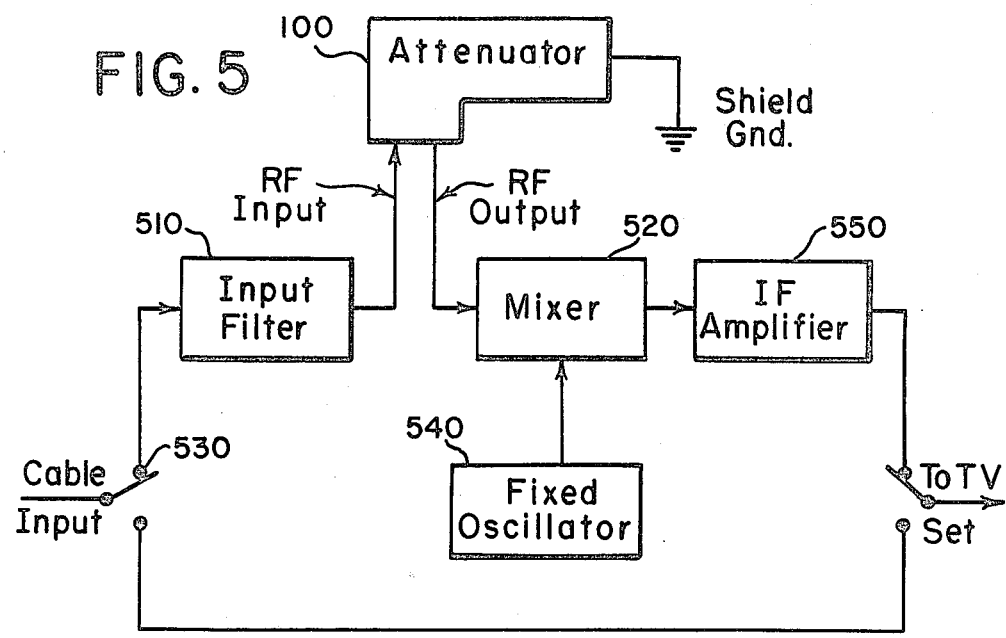
FIG. 5 is a schematic block diagram of a block converter showing the preferred position of the attenuator in the Radio Frequency circuit.

Referring now to FIG. 5 there is shown a conventional cable television block converter with the attenuator 100 of the invention connected as preferred between the input filter 510 and the mixer 520 of the converter Radio Frequency circuit. In this type converter the attenuator may alternatively be connected between the cable input 530 and the input filter 510 or between the mixer circuit 520 and the intermediate frequency amplifier circuit 550 of the converter.

Figure 6:
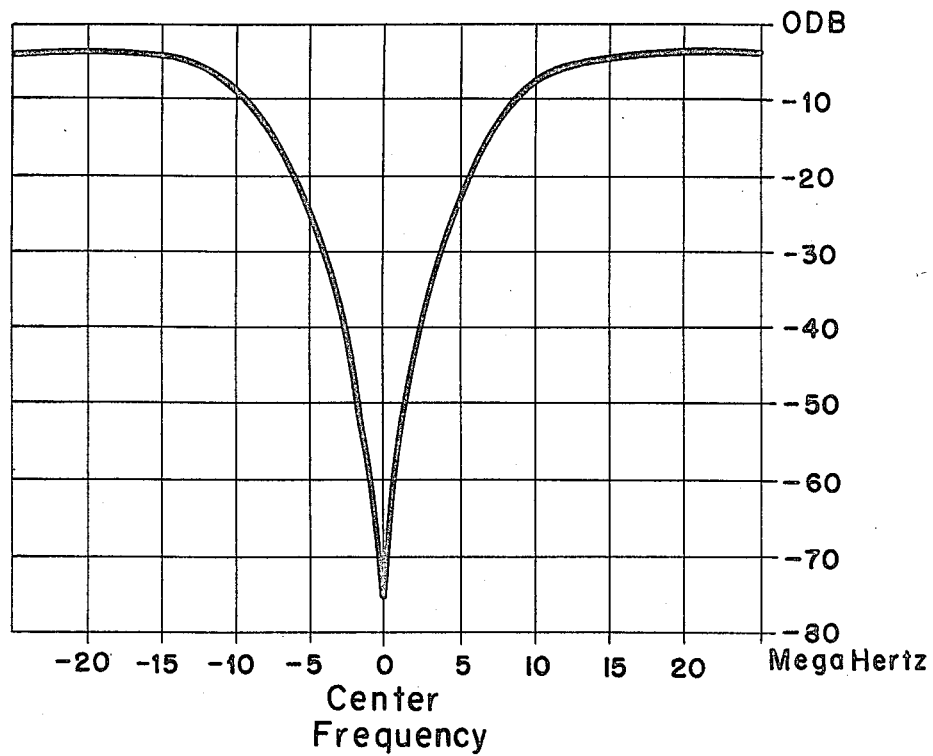
FIG. 6 is a plot of the frequency response of an attenuator of the invention.

Using the above principles, an attenuator 100 was designed to block the subscription television channel on a cable television system in the El Paso, TEX area. The bandstop constant K, T section L-C filter was designed for maximum attenuation at 107.25 megahertz which is the frequency of the video carrier of the subscription television channel. Capacitor C1 20 and C2 40 are of the small disc-type rated at 91 picofarads. Inductor L1 10 and L2 30 are $3\frac{1}{2}$ turns of 24 AWG laminated copper wire wound on a slug $\frac{1}{8}$ inch in diameter. C3 60 is also a small disc-type capacitor rated at 8 picofarads. Inductor L3 50 is $7\frac{1}{2}$–10 turns of 24 AWG laminated copper wire wound on a tunable slug $\frac{1}{8}$ inch in diameter. These components were mounted on a printed circuit board 70 as shown in FIG. 2 with minimum circuit path length between the components. The frequency response of this attenuator is shown in FIG. 6.

The physical presence of the attenuator in the Radio Frequency circuit of converter is essential to achieve tamper resistant attenuation of the subscription channel while maintaining proper reception of the remaining unattenuated cable channels. Therefore, close attention must be paid to installation of the attenuator in the converter and alignment of the converter after installation. The following procedures were found to be satisfactory for installing the above-described 107.25 megahertz attenuator in a converter of the type shown in FIG. 3:

1. A properly warmed up cable television converter tuned to receive the subscription channel is connected to a cable input showing at least 20 db millivolts input to the converter.
2. The output of the converter is connected to a television set tuned to the cable channel.
3. The cover of the radio frequency module of the converter is removed and power is applied to the converter.
4. Locate the feed through capacitor from the input filter 210 to the matching transformer of the double balanced mixer 220 and disconnect the wire connecting the capacitor to the transformer.
5. Place the attenuator 100 in the RF module as far from the cover as possible. p0 6. Connect the input of the attenuator 100 to the feed through capacitor.
7. Connect the output of the attenuator 100 to the matching transformer where the feed through capacitor was disconnected.
8. Connect the ground lead of the attenuator to shield ground.
9. Tune inductors L1 10 and L2 30 until maximum interference (snow) is achieved.
10. Tune the slug of inductor L3 50 for minimum reception.
11. Replace the RF module cover. If the interference decreases the attenuator must be further adjusted for maximum attenuation.
13. Align the converter for proper reception of the remaining cable channels.

Approximately 207 attenuators of the above design were built in early 1977. Two hundred converters containing these attenuators installed according to the above procedure were placed into service in a 19,000 subscriber area in El Paso, TEX in about May of 1977. The subscribers were not informed of the presence of the attenuators of the invention. Performance of the converters was monitored as an incidence of routine service calls. Since that time one attenuator has been tampered with and as a result the converter did not function properly on any channel.

As can be appreciated, any attempt to circumvent the interference effect of the attenuator will result in total malfunction of the converter, except in those rare instances where the tamperer has sufficient knowledge to enable him to realign the converter for proper reception after the attenuator has been removed.

I claim:

1. A tamper resistant subscription television converter, including a Radio Frequency circuit, comprising at least one bandstop filter means for attentuating a preselected subscription television band while passing the remaining television bands; said bandstop filter means being connected in said Radio Frequency circuit at a position requiring realignment of said converter in order to receive said remaining television bands; whereby tampering with said bandstop filter means, after said realignment tends to misalign the converter and thus cause interference with the reception of all the television bands.

2. In a subscription television converter having a Radio Frequency circuit including an input terminal, a Radio Frequency filter, a mixer and a tuned oscillator, the improvement comprising; including at least one bandstop filter means for attenuating a preselected television band while passing the remaining television bands; said bandstop filter means being connected in said Radio Frequency circuit at a position requiring realignment of said converter in order to receive said remaining television bands; whereby tampering with said bandstop filter means, after said realignment, tends to misalign the converter and thus cause interference with the reception of all the television bands.

3. An apparatus as defined in claim 2 wherein said bandstop filter means is connected between said input terminal and said radio frequency filter.

4. An apparatus as defined in claim 2 wherein said bandstop filter means is connected between said radio frequency filter and said mixer.

5. An apparatus as defined in claim 2 wherein said bandstop filter means is connected between said tuned oscillator and said mixer.

6. An apparatus as defined in claims 1, 2, 3, 4 or 5 wherein said bandstop filter is a constant K, T section L-C filter.

7. In a block type subscription television converter having a Radio Frequency circuit including an input terminal, an input filter, a mixer, a fixed oscillator, an intermediate frequency amplifier and an output terminal the improvement comprising; a tamper resistant trap including at least one bandstop filter means for attenuating a preselected subscription television band while passing the remaining television bands; said bandstop filter means being connected in said Radio Frequency circuit at a position requiring realignment of said converter in order to receive said remaining television bands; whereby tampering with said bandstop filter means, after said realignment tends to misalign the converter and thus cause interference with the reception of all the television bands.

8. An apparatus as defined in claim 7 wherein said bandstop filter means is connected between said input terminals and said input filter.

9. An apparatus as defined in claim 7 wherein said bandstop filter means is connected between said input filter and said mixer.

10. An apparatus as defined in claim 7 wherein said bandstop filter means is connected between said mixer and said intermediate frequency amplifier.

11. An apparatus as defined in claims 7, 8, 9 or 10 wherein said bandstop filter is a constant K, T section L-C filter.

12. A method for rendering an aligned multi-channel subscription television converter tamper resistant comprising:
  a. connecting at least one bandstop filter means for attenuating a selected television bands, in the Radio Frequency circuit of said converter at a position requiring realignment of said converter;
  b. tuning said bandstop filter for maximum attenuation of said selected band;
  c. realigning said converter for proper reception of the remaining television bands, whereby proper reception of said bands is dependent upon the undisturbed presence of said bandstop filter.

* * * * *

UNITED STATES PATENT AND TRADEMARK OFFICE
CERTIFICATE OF CORRECTION

PATENT NO. : 4,286,288
DATED : August 25, 1981
INVENTOR(S) : James K. Waldo

It is certified that error appears in the above—identified patent and that said Letters Patent is hereby corrected as shown below:

Column 3, line 5, "balanced mixer 330" should read --balanced mixer 320--.

Column 3, line 62, delete "p0".

Column 3, line 62, "6. Connect the input of the" should be placed at the margin.

Signed and Sealed this

Second Day of February 1982

[SEAL]

Attest:

Attesting Officer

GERALD J. MOSSINGHOFF
Commissioner of Patents and Trademarks